(12) United States Patent
Garbers et al.

(10) Patent No.: US 12,227,677 B2
(45) Date of Patent: Feb. 18, 2025

(54) ADHESIVE SUITABLE FOR AN ON-THE-FLY ROLL CHANGE OF MATERIALS WITH LOW-ENERGY SURFACES

(71) Applicant: tesa SE, Norderstedt (DE)

(72) Inventors: Julia Garbers, Hamburg (DE); Thilo Dollase, Hamburg (DE); Niels Czerwonatis, Hamburg (DE); Felix Köstner, Hamburg (DE)

(73) Assignee: tesa SE, Norderstedt (DE)

( * ) Notice: Subject to any disclaimer, the term of this patent is extended or adjusted under 35 U.S.C. 154(b) by 367 days.

(21) Appl. No.: 17/785,788

(22) PCT Filed: Dec. 9, 2020

(86) PCT No.: PCT/EP2020/085293
§ 371 (c)(1),
(2) Date: Jun. 15, 2022

(87) PCT Pub. No.: WO2021/122227
PCT Pub. Date: Jun. 24, 2021

(65) Prior Publication Data
US 2023/0070641 A1    Mar. 9, 2023

(30) Foreign Application Priority Data
Dec. 20, 2019  (DE) .......................... 102019220424.4

(51) Int. Cl.
*C09J 153/02* (2006.01)
*C09J 11/06* (2006.01)
*C09J 11/08* (2006.01)

(52) U.S. Cl.
CPC ............. *C09J 153/02* (2013.01); *C09J 11/06* (2013.01); *C09J 11/08* (2013.01);
(Continued)

(58) Field of Classification Search
CPC . C09J 153/02; C09J 11/06; C09J 11/08; C09J 2301/408; C09J 2203/342; C09J 2409/00
(Continued)

(56) References Cited

U.S. PATENT DOCUMENTS 6,432,241 B1    8/2002  Congard et al.
2002/0056784 A1  5/2002  Davies et al.
(Continued)

FOREIGN PATENT DOCUMENTS

CN    1890342 A    1/2007
CN    101400591 A   4/2009
(Continued)

OTHER PUBLICATIONS

China National Intellectual Property Administration, Notice of Allowance for China Patent Application No. 202080088633.6, dated Apr. 25, 2024, 4 pages.
(Continued)

*Primary Examiner* — Ling Siu Choi
*Assistant Examiner* — Ronald Grinsted
(74) *Attorney, Agent, or Firm* — Price Heneveld LLP (57) ABSTRACT

An adhesive that comprises: (a) 35 to 55 wt. % of an elastomer component; (b) 20 to 45 wt. % of an adhesive resin component; and (c) 15 to 40 wt. % of a plasticizing component, wherein (c1) 8 to 35 wt. % of (c) is made of one or more plasticizing oils, and (c2) optionally up to 32 wt. % of (c) is made of one or more plasticizers that differ from plasticizing oils.

20 Claims, 2 Drawing Sheets

(52) U.S. Cl.
CPC .... *C09J 2203/342* (2013.01); *C09J 2301/408* (2020.08); *C09J 2409/00* (2013.01)

(58) Field of Classification Search
USPC .......................................................... 524/505
See application file for complete search history.

(56) References Cited

U.S. PATENT DOCUMENTS

| | | |
|---|---|---|
| 2004/0075014 A1 | 4/2004 | Jacobs et al. |
| 2005/0126688 A1 | 6/2005 | Bean et al. |
| 2017/0137246 A1 | 5/2017 | Blömker et al. |
| 2019/0023949 A1 | 1/2019 | Dalley |

FOREIGN PATENT DOCUMENTS

| | | | |
|---|---|---|---|
| CN | 106905888 A | 6/2017 | |
| CN | 109266268 A | 1/2019 | |
| DE | 19632689 A1 | 2/1998 | |
| DE | 69131448 T2 | 11/1999 | |
| DE | 19841609 A1 | 3/2000 | |
| DE | 19902179 A1 | 8/2000 | |
| DE | 10357321 A1 | 7/2005 | |
| DE | 102015222282 A1 | 5/2017 | |
| EP | 1076026 A2 | 2/2001 | |
| EP | 1988141 A1 | 11/2008 | |
| EP | 1989136 A1 | 11/2008 | |
| EP | 2116581 A1 | 11/2009 | |
| EP | 2130886 A2 | 12/2009 | |
| EP | 2130887 A2 | 12/2009 | |
| EP | 2130888 A2 | 12/2009 | |
| EP | 2130889 A2 | 12/2009 | |
| EP | 3173452 A1 | 5/2017 | |
| EP | 3431563 A1 | 1/2019 | |
| EP | 3431563 B1 * | 5/2022 | .............. C09J 11/08 |
| JP | 2007514021 A | 5/2007 | |
| JP | 2011057887 A | 3/2011 | |
| WO | 9108159 A1 | 6/1991 | |
| WO | 2018184198 A1 | 10/2018 | |

OTHER PUBLICATIONS

China National Intellectual Property Administration, Second Office Action for Chinese Patent Application No. 202080088633.6, mailed Dec. 26, 2023, 17 pages.
China National Intellectual Property Administration, The First Office Action for China Patent Application No. 202080088633.6, dated Apr. 4, 2023, 21 pages.
Japan Patent Office, Office Action for Japan Patent Application No. 2022-537448, mailed Jun. 21, 2023, 10 pages.
Donker, C., Proceedings of the Pressure Sensitive Tape Council, 2001, pp. 149-164.
Hanser, C., Handbook Kunststoff-Additive, 2016, 4th edition, section 5.6, Munich.
Jagisch, F. C., and J. M. Tancrede, Handbook of Pressure Sensitive Adhesive Technology, D. Satas (ed.), 1999, 3rd edition, chapter 16, pp. 377-379, Satas & Associates, Warwick, Rhode Island.
German Office Action, German Patent Application No. 10 2019 220 424.4, German Patent Office, Mar. 10, 2021, 3 pages.

* cited by examiner

ADHESIVE SUITABLE FOR AN ON-THE-FLY ROLL CHANGE OF MATERIALS WITH LOW-ENERGY SURFACES

CROSS-REFERENCE TO RELATED APPLICATIONS

This application is a U.S. national stage application under 35 U.S.C. § 371 that claims the benefit of priority under 35 U.S.C. § 365 of International Patent Application No. PCT/EP2020/085293, filed on Dec. 9, 2020, designating the United States of America, which in turn claims the benefit of priority under 35 U.S.C. §§ 119, 365 of German Patent Application No. 102019220424.4, filed Dec. 20, 2019, the contents of which are relied upon and incorporated herein by reference in their entirety.

FIELD OF THE DISCLOSURE

The invention relates to an adhesive particularly for use for an adhesive tape for on-the-fly roll change ("flying splice"), of flat web material wound into rolls, in accordance with the features of the preamble of the main claim, and also to a method for the flying splice of apolar flat web material wound into rolls.

BACKGROUND

In the processing of flat web material (paper, foils, nonwovens or the like) flying splice is a common method for replacing an old, almost depleted roll with a new roll without having to stop the machines for the purpose, these machines operating at high speed. In such flying splices, pressure-sensitive adhesive tapes are frequently employed, in order, for example, on the one hand to join the end of the old web to the start of the new web and on the other hand to adhere the web at full machine speed to a new core at take-up.

In the foil-processing and nonwoven-processing industry, a flying splice (also called "dynamic splice") is carried out on materials having apolar surfaces in accordance with two different methods.

In the first method, double-sided self-adhesive tapes are bonded manually at the start of the web of the new roll in an advantageous arrangement (ordinarily linear, or w- or v-shaped) and the web material protruding beyond the adhesive tape is removed. In addition the start of the web of the new roll is secured using so-called fixing labels on the underlying turn of the new roll, in order to prevent the web being unwound when the new roll is accelerating to the circumferential speed of the old roll. A disadvantage of this method is that the preparation of the rolls is very time-consuming and the bonding necessitates the deployment of skilled personnel. Moreover, the method does not always lead to the desired outcomes, as the bonds obtained accordingly are relatively thick, owing to the layering of web material, fixing labels and adhesive strips. Furthermore, in the case of thin, flexible web materials in particular, it may happen that bulges appear in the web material at the start of a new web, owing to the opposing air stream occurring on rotation, and this may lead in general to poor bonding of the webs.

In the second known method, a single-sided self-adhesive tape is bonded with overlap and in a straight line under the free end of the topmost web of the new roll, so that the adhesive side faces outward and is covered only partly by the new web. The exposed part of the outward-facing adhesive side is bonded to the web of the old roll. In this method, in order to prevent unwinding of the web during acceleration of the new roll to the surface velocity of the old roll, a liquid is introduced between the topmost turn of a new roll and the underlying turn, so that the upper turn is secured on the underlying turn by the capillary forces. A disadvantage in this case is that this method as well requires the deployment of skilled staff and nevertheless does not always lead to technically advantageous outcomes, since the efficiency of securement of the web material by a liquid is dependent on numerous parameters, examples being the surface energy, flexibility, and basis weight of the foil material, the amount of liquid used, its polarity, viscosity, and density, and also the layer thickness, surface area and shear characteristics of the film of liquid. A decisive disadvantage of this method, moreover, is that the web speed during the splice must not be too high, and the liquid used also causes contamination of the facility and of the web material.

The above method is also employed in the paper-processing industry. There, a development of the first method is the splicing method wherein the tab serving for securement (in this context, a double-sided adhesive tape comprising a carrier material in the interior) is integrated in the self-adhesive tape that joins the paper webs. After the joining of the webs, a dividable carrier splits in this case, and so a part of the dividable carrier remains on the self-adhesive tape joining the webs (i.e., on the upper turn), while the other part remains on the underlying turn. Carriers are referred to as "dividable" when they can be split parallel to their superficial extent, and more particularly those carriers which actually do also split, relative to the requirements in a splicing method.

A number of products are known in the paper-processing industry for implementing this method. For instance DE 196 32 689 A2 discloses an adhesive tape which in addition to the main carrier is furnished with a dividable paper carrier. Under the dynamic loads accompanying the joining of the webs of two rolls, the paper carrier splits and, with its remnants, non-adhesively covers the adhesive used for securement, in a region which otherwise lies exposed in the case of other adhesive tapes. DE 199 02 179 A1 likewise discloses an adhesive tape of this kind, in which the dividable paper carrier is arranged at an offset to the main carrier, in order to prevent tearing under load.

In order to improve flying splice in the foil-processing and nonwoven-processing industry, adhesive tapes are now also used which have a similar design to those already known from the paper-processing industry. This is an aim in particular for foil and nonwoven materials having apolar surfaces. Apolar surfaces of this kind are found in materials having a low surface energy, as in the case of polyethylene, polypropylene, polyethylene terephthalate (PET) or polymer-coated papers, for example. A surface energy is low when it amounts to 50 mN/m or less. Such apolar surfaces require self-adhesive compounds which have a particularly high degree of adhesiveness and at the same time of tack. The high peel adhesion and high tack necessary for these purposes may ordinarily be obtained by increasing the flowability of the adhesive. For flying splice in the case of apolar foil and nonwoven materials, however, conventional high-adhesive and high-tack adhesives are poorly suitable or completely unsuitable in the context of a splicing method. EP 06 819 521 A discloses a solution by providing a synthetic rubber-based adhesive with technical adhesive parameters favorable to its use for the bonding of apolar surfaces.

Foil materials are frequently admixed with lubricants, in order to improve the processing properties—for instance, to reduce the adhesion of the hot polymer melt to surfaces during production—and more particularly, as a result of the lubricants, the foil acquires the surface properties desirable for the particular application. Examples of lubricants used are compounds with alcohols, acids, soaps, amides or esters as functional groups: fatty acid amides are an example. Typical lubricant additions amount to 0.2 to 2%, more particularly 0.2 to 0.8% in the foil composition.

When bonding takes place to surfaces composed of lubricant-containing materials, in particular, however, there is still a problem, since the lubricants generally employed in particular in film and foil materials (such lubricants also being referred to as slip additives or high-slip additives)—such as erucamides, oleamides and the like—have a high propensity to migrate and are therefore deleterious to the adhesive properties of the adhesive layers used, such as their initial tack and the initial peel adhesion. It is especially desirable, therefore, for the flow-on behavior of the adhesives used onto the stated surfaces to be optimized, without significantly impairing, for instance, the peel adhesion and the shear strength of the adhesive.

The object of the invention was therefore to provide an adhesive for an adhesive tape which is suitable in particular for the bonding of foil materials and/or film materials, especially for those which contain migrating ingredients such as lubricants—for instance erucamides, oleamides or the like.

It is particularly advantageous if the adhesive tapes are suitable for an aforesaid flying splice operation at high web speeds on flat web material wound into rolls. It would be an additional advantage—though not absolutely necessary—if the adhesive in question could also be utilized for bonding to a multiplicity of other materials.

SUMMARY OF THE DISCLOSURE

The object has surprisingly been achieved by means of an adhesive, comprising
(a) 35 to 55 wt % of an elastomer component;
(b) 20 to 45 wt % of a tackifier resin component; and
(c) 15 to 40 wt % of a plasticizing component, of which
(c1) 8 to 35 wt % is formed by a plasticizing oil or a plurality of plasticizing oils, and
(c2) 0 to 32 wt % is formed by one or more non-mineral-oil plasticizers.

Plasticizing oils used comprise mineral oils, selected, in some embodiments, more particularly from naphthenic and paraffinic mineral oils.

In a very advantageous embodiment the adhesive of the invention exhibits self-adhesive or pressure-sensitive adhesive properties.

A further subject of the invention is an adhesive tape comprising at least one layer of an adhesive which comprises
(a) 35 to 55 wt % of an elastomer component;
(b) 20 to 45 wt % of a tackifier resin component; and
(c) 15 to 40 wt % of a plasticizing component, of which
(c1) 8 to 35 wt % is formed by a plasticizing oil or a plurality of plasticizing oils, and
(c2) 0 to 32 wt % is formed by one or more non-mineral-oil plasticizers,
in accordance with the observations in this specification.

As mentioned the adhesive here as well is very advantageously a self-adhesive.

Adhesive tapes with the adhesive of the invention may advantageously also be configured as single-sided or double-sided adhesive tapes, comprising a carrier layer and optionally further layers. Adhesive tapes furnished adhesively on one side have an external layer of the adhesive of the invention—which is optionally lined temporarily with a liner—while the opposite side is furnished nonadhesively. Double-sided adhesive tapes have two external layers of adhesive—likewise optionally lined temporarily with the liners—of which at least one of the external layers of adhesive corresponds to the adhesive of the invention, although both external layers of adhesive may also be in accordance with the invention. Where the external layers of adhesive are both based on an adhesive of the invention, they may be chemically identical or may differ, that is, may be different in composition.

DETAILED DESCRIPTION OF THE PREFERRED EMBODIMENTS

The object has surprisingly been achieved by means of an adhesive, comprising
(a) 35 to 55 wt % of an elastomer component;
(b) 20 to 45 wt % of a tackifier resin component; and
(c) 15 to 40 wt % of a plasticizing component, of which
(c1) 8 to 35 wt % is formed by a plasticizing oil or a plurality of plasticizing oils, and
(c2) 0 to 32 wt % is formed by one or more non-mineral-oil plasticizers.

The weight percentages given above are based on the composition of the base adhesive. From the weight percentages indicated in each case, the composition of the base adhesive may be assembled in such a way that the total sum adds up to 100%. A prerequisite in each case is that the stated components are present within the specified fractional ranges. The term "composition of the base adhesive" above means that optional adjuvants and additives—as are also stated, for instance, further on in this text—must be calculated additively with respect to the aforesaid 100% of the base adhesive—made up of components a), b), (c1) and (c2), and so the fractions of the resultant blended overall adhesive formulation must be converted accordingly, depending on the amount of added adjuvants and/or additives.

In the invention at least 8 wt % of the base adhesive is formed by one or more plasticizing oils (component (c1)). Plasticizers referred to as non-mineral oil plasticizers (component (c2)) are those plasticizing substances which are not encompassed by the plasticizing oils of component (c1). Non-mineral-oil plasticizers may be present optionally, provided the conditions of the plasticizing oil are met. Insofar as this specification uses the term "the plasticizing oil", this is also intended to relate to the plasticizing oils in their entirety, for the embodiments wherein two or more plasticizing oils are present, unless otherwise stated individually. Where the plasticizing component (c) is more than 35 wt % of the base adhesive, at least 5 wt % (up to a maximum of 32 wt %) of the non-mineral-oil plasticizer or plasticizers (component (c2)) is present.

Plasticizing oils used comprise mineral oils, selected more particularly from naphthenic and paraffinic mineral oils.

In a very advantageous embodiment the adhesive of the invention exhibits self-adhesive properties. In the context of this specification, the terms "self-adhesive" and "pressure-sensitive adhesive" are used synonymously, as customary in the prior art and the relevant literature. Similarly the terms "adhesive" and "adhesive compound" are used synonymously.

Where the "adhesive" or "adhesive compound" is used in the context of this specification, particularly when describing particular embodiments of the adhesive or when the embodiments of the adhesive tape likewise of the invention are used with this adhesive, the intention—irrespective of whether there is or is not an explicit reference thereto at the corresponding point in the text—is explicitly to include the respective configuration of the adhesive as a self-adhesive (pressure-sensitive adhesive) as a particular embodiment of the respective configuration, and so it is fundamentally the case for all configurations shown that they are also advantageous in particular if the adhesive described there is a self-adhesive.

Pressure-sensitive adhesiveness is that capacity of a substance to enter into a permanent connection to a substrate at the application temperature, typically even at room temperature (defined here as 23° C.) under even a relatively gentle applied pressure. Substances possessing this capacity are referred to as pressure-sensitive adhesives (PSAs). PSAs have been known for a long time. Frequently after use they can be detached again substantially without residue from the substrate. PSAs generally have a permanent inherent tack at room temperature, thus exhibiting a certain viscosity and tackiness, so that they wet the surface of the respective substrate even under low applied pressure. The ability of a PSA to adhere to materials and transmit forces derives from the adhesive capacity and the cohesion of the PSA. PSAs may be considered to be liquids of extremely high viscosity with an elastic component. PSAs accordingly have particular, characteristic viscoelastic properties leading to the permanent inherent tack and adhesiveness. A characteristic of them is that when they are mechanically deformed, there are processes both of viscous flow and of development of elastic forces of resilience. In terms of their respective proportion, there is a certain ratio between the two processes, dependent not only on the precise composition, the structure and the degree of crosslinking of the PSA in question but also on the rate and duration of the deformation, and on the temperature.

The extent of the adhesion of self-adhesives or pressure-sensitive adhesives is also dependent on the nature of the particular substrate. For instance there are PSAs which adhere in particular to polar surfaces, namely surfaces of high energy, such as the surface of numerous metals, steel for example, for instance, or those which adhere preferentially to apolar substrates, being substrates of low energy. Numerous polymer materials and plastics have low-energy surfaces, with for instance polyethylene (PE, with low density: LDPE, with high density: HDPE) natural rubber (NR), nitrile rubber (NBR), silicone rubber (MVQ), ethylene-vinyl acetate (EVA), ethylene-propylene-diene rubber (EPDM), polyethylene terephthalate (PET), polyoxymethylene (POM, polyacetal), polypropylene (PP), polystyrene (PS), polytetrafluoroethylene (PTFE) and polybutylene terephthalate (PBT) being materials having low-energy surfaces. Conversely there are substrates known as "antiadhesive" substrates, on which the usual PSAs generally exhibit poor adhesion or none. The self-adhesives and PSAs described in the invention have good adhesion properties in particular to a multiplicity of apolar (low-energy) materials. Although this is not the only application for adhesive tapes of the invention, adhesive tapes of the invention are especially suitable for the splicing of polymeric foils and in this respect in particular for the splicing of those foils which contain or carry on their surface lubricants (slip additives; in this regard see, for example, Handbook Kunststoff-Additive, 4th edition, 2016, C. Hanser, Munich, section 5.6). Lubricant-containing polyolefin foils are a nonlimiting example.

The bonding of lubricant-containing foils/films poses a challenge insofar as the lubricants have a strongly negative influence on the tack and the initial peel adhesion, as is observed on page 672 in the Handbook Kunststoff-Additive (4th edition, 2016, C. Hanser, Munich).

As a result of the outstanding flow-on behavior, the adhesive of the invention can also be deployed to particularly good effect on rough surfaces, such as, for example, for nonwoven substrates.

A further subject of the invention is an adhesive tape comprising at least one layer of an adhesive which comprises
   (a) 35 to 55 wt % of an elastomer component;
   (b) 20 to 45 wt % of a tackifier resin component; and
   (c) 15 to 40 wt % of a plasticizing component, of which
     (c1) 8 to 35 wt % is formed by a plasticizing oil or a plurality of plasticizing oils, and
     (c2) 0 to 32 wt % is formed by one or more non-mineral-oil plasticizers,
in accordance with the observations in this specification.

As mentioned the adhesive here as well is very advantageously a self-adhesive.

Adhesive tapes of these kinds may have a one-layer embodiment, in other words in the form of what are called adhesive transfer tapes, where the layer of adhesive is applied in particular as a layer to a temporary carrier (known as the liner) which in particular is anti-adhesive. For protection the second adhesive surface may also be lined temporarily with a liner. Such adhesive transfer tapes are typically used by then applying the layer of adhesive, by its exposed adhesive surface—optionally after removal of one of the liners, if the adhesive transfer tape was lined on both sides—to one of the surfaces to be bonded, removing the remaining liner, and bringing the second adhesive surface into contact with the other surface to be bonded. Additives, fibers for example, may be added to the adhesive in order to stabilize such one-layer adhesive systems—that is, such as adhesive transfer tapes.

Adhesive tapes with the adhesive of the invention may advantageously also be configured as single-sided or double-sided adhesive tapes, comprising a carrier layer and optionally further layers. Adhesive tapes furnished adhesively on one side have an external layer of the adhesive of the invention—which is optionally lined temporarily with a liner—while the opposite side is furnished non-adhesively. Double-sided adhesive tapes have two external layers of adhesive—likewise optionally lined temporarily with the liners—of which at least one of the external layers of adhesive corresponds to the adhesive of the invention, although both external layers of adhesive may also be in accordance with the invention. Where the external layers of adhesive are both based on an adhesive of the invention, they may be chemically identical or may differ, that is, may be different in composition.

Where the external layers of adhesive of double-sided adhesive tapes differ chemically, the second adhesive, not in accordance with the invention, may also be an entirely different adhesive, for instance a self-adhesive with a different chemical basis—such as, for example, an acrylate adhesive, a polyurethane adhesive, a silicone adhesive or a rubber adhesive, or may be a self-adhesive or non-self-adhesive, activatable adhesive, such as a heat-activatable, radiation-activatable or moisture-activatable adhesive, or in principle may be any other kind of adhesive.

Double-sided adhesive tapes may have a symmetrical or asymmetrical construction, and accordingly both external layers of adhesive for instance may have the same thickness or different thicknesses.

The adhesive tapes of the invention have outstanding adhesive properties. They can also be used with particular advantage wherever effective bonding requires outstanding flow-on properties to one or both substrate surfaces.

In one very advantageous embodiment, the adhesive tape of the invention is designed such that it is suitable for the flying splice of flat web material wound into rolls, more particularly of flat web materials having low surface energies and/or very rough surfaces, like those of nonwovens, for example. The surface energy of a material is deemed to be low when it amounts to 50 mN/m or less. The adhesive tape of the invention is suitable advantageously in particular for the flying splice of foil materials and/or film materials, more particularly those foil materials and/or film materials which comprise migrating ingredients, such as, for example, lubricants—for instance erucamides, oleamides or the like, which in particular may also be present on the surface of the foil/film materials. In principle for this end use it is also possible to employ adhesive transfer tapes or single- or double-sided adhesive tapes, as have been described above.

Adhesive tapes of this kind for flying splice, however, advantageously comprise at least two opposite layers of adhesive, namely an upper layer and a lower layer of adhesive. Layers of self-adhesive are advantageous. In the course of their construction the adhesive tapes of the invention advantageously have a dividable carrier.

The designation of the layers of adhesive as "upper" and "lower" adhesive is selected here as usual in accordance with the positioning of the adhesive tape in the flying splice operation (also referred to in this text as "splicing method"): in the splicing method, the upper adhesive serves to join the corresponding side ("top side") of the adhesive tape of the invention to the web start of the new roll and to the almost depleted web of the old roll, thereby joining the webs of the two rolls by way of the adhesive tape. The lower adhesive serves to join the here-corresponding side ("bottom side") of the adhesive tape of the invention to the second-topmost turn, thereby initially joining the topmost and the second-topmost turns of the new roll to one another by way of the adhesive tape. In the further course of the splicing method, when the dividable carrier splits, the join of the upper two turns of the roll is parted again, specifically in such a way that the adhesive regions of the upper adhesive and of the lower adhesive, facing away from the top side of the respective turn, remain lined non-adhesively with the carrier which has now split.

If the aim is to give such a splicing method an advantageous design, this may be brought about via the specific design of the upper adhesive and of the lower adhesive in terms of their peel adhesion, tack, and viscosity. Taking account of the complex viscosity when choosing the lower adhesive results in solutions where cold flow of the lower adhesive is prevented. As a result, the adhesive on the lower side of the dividable carrier is unable to emerge from the bondline and bond to the upper side of the dividable carrier, thereby preventing blocking of the carrier and retaining the dividable capability of the system.

For the upper adhesive it is advantageous in particular to choose a compound which meets the requirements for a foil splicing operation and which in particular has a self-adhesive design. Advantageously it has sufficient tack to attach well to apolar materials, especially polyolefinic substrates, in the splicing operation, and should not shear off from such substrates in the operation, thus preferably possessing good shear strength thereon, and developing sufficient peel adhesions on the polyolefinic material.

The adhesive of the invention is outstandingly suitable as upper adhesive of an adhesive tape for the flying splice of apolar materials—such as, for instance, polyolefinic materials—and more particularly materials which comprise lubricants, and also for flat web materials having rough surfaces. Accordingly, one advantageous embodiment of the adhesive tape of the invention is that wherein the layer of the adhesive which comprises the following components:
  (a) 35 to 55 wt % of an elastomer component;
  (b) 20 to 45 wt % of a tackifier resin component; and
  (c) 15 to 40 wt % of a plasticizing component, of which
    (c1) 8 to 35 wt % is formed by a plasticizing oil or a plurality of plasticizing oils, and
    (c2) 0 to 32 wt % is formed by one or more non-mineral-oil plasticizers,
is the upper layer of adhesive of the adhesive tape of the invention.

The lower layer of adhesive here may be a layer as known per se from the prior art for polar or apolar materials.

It has emerged, however, that the adhesive of the invention may also be used very advantageously as lower layer of adhesive of such an adhesive tape. In a further advantageous embodiment of the adhesive tape of the invention, therefore, both the upper and the lower layers of adhesive are formed by an adhesive which is composed of at least the following components:
  (a) 35 to 55 wt % of an elastomer component;
  (b) 20 to 45 wt % of a tackifier resin component; and
  (c) 15 to 40 wt % of a plasticizing component, of which
    (c1) 8 to 35 wt % is formed by a plasticizing oil or a plurality of plasticizing oils, and
    (c2) 0 to 32 wt % is formed by one or more non-mineral-oil plasticizers.

The two adhesives which in this embodiment form the lower and the upper layers of adhesive may be completely identical in their composition. However, they may also differ, provided both adhesives each per se conform to the general composition with the components (a), (b) and (c) in the proportional ranges specified above.

It is advantageous for the adhesive tape of the invention if the adhesive used as upper adhesive and/or as lower adhesive has a peel adhesion on a polyethylene substrate of 2.0 N/cm, preferably of 3.0 N/cm or more (measurement method PA PE 180°; see later on). This achieves particularly efficient adhesion of the adhesive tape on the apolar flat web material to be joined, and this has the overall effect of improving still further the integrity of the bond and hence the efficiency of the splicing method.

It is also advantageous if the adhesive used as upper adhesive is an adhesive which has a tack corresponding to a roll path length of 40 mm or less (see RBT test method below, experimental section), it being particularly advantageous if this roll path length, which is used as a measure of the tack, is 20 mm or less. The effect of this is a particularly high efficiency in the joining of the webs by the bringing-together of the two rotating rolls.

Composition of the Adhesive of the Invention

Elastomer Component (a)

The elastomer component (a) advantageously comprises one or more polyvinylaromatic-polydiene block copolymers or consists entirely of these copolymers. The fraction of polyvinylaromatic-polydiene block copolymers in the elastomer component is preferably at least 90 wt %. Typically and advantageously in the invention, the polydiene is made of conjugated diene such as, in particular, 1,3-diene.

The middle diblock fraction here, based on the overall polyvinylaromatic-polydiene block copolymers, is preferably at least 30 wt % and very preferably at least 50 wt %. The diblock fraction may even advantageously be at least 70 wt %.

Polydiene blocks of the polyvinylaromatic-polydiene block copolymers preferably have an average vinyl fraction of less than 20 wt %, based on the overall polydiene blocks. Also preferably the polydiene blocks of the polyvinylaromatic-polydiene block copolymers have an average vinyl fraction of less than 17 wt %, more preferably less than 13 wt %, based on the overall polydiene blocks.

The peak molar mass of at least one block copolymer of the elastomer component is typically between 80,000 g/mol and 500,000 g/mol, preferably between 100,000 g/mol and 200,000 g/mol.

The elastomer component typically comprises at least one synthetic rubber in the form of a diblock copolymer having an A-B construction, and may further comprise a synthetic rubber in the form of a block copolymer having the construction A-B-A, (A-B)n, (A-B)nX or (A-B-A)nX, in which
the blocks A independently of one another are a polymer formed by polymerization of at least one vinylaromatic;
the blocks B independently of one another are a polymer formed by polymerization of conjugated dienes having 4 to 18 carbon atoms;
X is the radical of a coupling reagent or polyfunctional initiator; and
n is an integer ≥2.

All synthetic rubbers of the PSA layer of the invention may be block copolymers having a construction as set out above. The PSA layer of the invention may therefore also comprise mixtures of different block copolymers having a construction as above.

The at least one suitable block copolymer thus typically comprises one or more rubberlike blocks B (elastomer blocks, soft blocks) and at least one glasslike block A (hard blocks). With particular preference at least one synthetic rubber of the PSA layer of the invention is a block copolymer having a construction A-B which is present in combination with A-B-A, (A-B)2X, (A-B)3X and/or (A-B)4X, with A, B and X having the definitions above.

PSA layers typically employed are those based on block copolymers containing polymer blocks predominantly formed from vinylaromatics (A blocks), preferably styrene, and blocks predominantly formed by polymerization of 1,3-dienes (B blocks) such as, for example, butadiene and isoprene or a copolymer of these. The block copolymers of the PSA layers preferably possess at least one polystyrene end block.

In place of the preferred polystyrene blocks, the vinylaromatics utilized may also be polymer blocks based on other aromatic-containing homopolymers and copolymers (preferably C8 to C12 aromatics) having glass transition temperatures of greater than 75° C., such as, for example, α-methylstyrene-containing aromatic blocks. There may also be identical or different A blocks present. Vinylaromatics for the construction of the block A include preferably styrene α-methylstyrene and/or other styrene derivatives. The block A may therefore take the form of a homopolymer or copolymer. With particular preference the block A is a polystyrene.

Preferred conjugated dienes as monomers for the soft block B are selected more particularly from the group consisting of butadiene, isoprene, ethylbutadiene, phenylbutadiene, piperylene, pentadiene, hexadiene, ethylhexadiene and dimethylbutadiene and also any desired mixtures of these monomers. The block B as well may take the form of a homopolymer or a copolymer. With particular preference the conjugated dienes as monomers for the soft block B are selected from butadiene and isoprene. For example the soft block B is a polyisoprene or a polybutadiene or a polymer of a mixture of butadiene and isoprene. Very preferably the block B is a polybutadiene.

A blocks in the context of this invention are also referred to as "hard blocks". B blocks are also, correspondingly, called "soft blocks" or "elastomer blocks". This reflects the selection of the blocks in accordance with the invention, according to their glass transition temperatures (for A blocks at least 25° C., more particularly at least 50° C. and for B blocks at most 25° C., more particularly at most −25° C.). These figures are based on the pure, unblended block copolymers.

The fraction of hard block in the block copolymers is at least 12 wt % and not more than 40 wt %, preferably at least 15 wt % and not more than 35 wt %. Where the block copolymer is a polyvinylaromatic-polybutadiene block copolymer, the hard block fraction is advantageously at least 20 wt %.

The block copolymers resulting from the A and B blocks may comprise identical or different B blocks, including in terms of the microstructure. The "microstructure" refers to the relative portion of the types of monomer linkage that are possible for polybutadiene, polyisoprene or another conjugated diene such as 1,3-diene, in particular, namely 1,4-cis (in polybutadiene and polyisoprene), 1,4-trans (in polybutadiene and polyisoprene), 1,2 (in polybutadiene and polyisoprene) and 3,4 (in polyisoprene); preference is given to a 1,4 fraction (cis+trans) of >80 wt %, very preferably of >85 wt %, based in each case on the polydiene blocks, and a 1,4-cis fraction of >40 wt %, based on the polydiene blocks; correspondingly, the fraction of 1,2-linked and/or any 3,4-linked monomers present in total, i.e., the so-called vinyl fraction determined by test IX, is at most 20 wt %, preferably at most 17 wt %, very preferably at most 13 wt %. A high fraction of 1,4-linkage and more particularly 1,4-cis linkage of the monomer units in the polydiene blocks, or a low fraction of vinyl groups, leads to a lower glass transition temperature, allowing good tack to be achieved even at relatively low temperature, this being advantageous for a splicing operation in a cold environment. Polybutadiene is therefore also preferred as the variety for the B block or B blocks. In an alternative embodiment, the quantitative figures for the types of monomer linkage, such as for the vinyl fraction in particular, relate not to wt % but instead to mol %.

Commercially available block copolymer types frequently have a combination of polymers of different architecture. Accordingly, for example, Kraton D1118, nominally a linear polystyrene-polybutadiene diblock copolymer, comprises 78% of diblock copolymer according to manufacturer figures (Kraton Polymers Product Guide, Kraton Performance Polymers Inc., 2016). The details given above for the molar mass of the block copolymers are based in each case on the mode of polymer which a skilled person is able to assign to the block copolymer architecture identified in the corresponding context. Figures for the molar mass in this context are to be understood as peak molar mass. GPC allows the molar mass of the individual polymer modes to be ascertained in a mixture of different block copolymers.

Tackifier Resin Component (b)

The PSA layer of the invention comprises not only the at least one polyvinylaromatic-polydiene block copolymer but also at least one tackifier resin, in order to increase the adhesion in a desired way.

A "tackifier resin" according to the general understanding of those skilled in the art, is an oligomeric or polymeric resin which increases adhesion (tack, intrinsic stickiness) of the PSA layer as compared with the otherwise identical PSA layer not containing any tackifier resin. Tackifier resins are specific compounds having a low molar mass by comparison with the elastomers, typically having a weight-average molecular weight MW<5000 g/mol. The weight-average molecular weight is customarily from 400 to 5000 g/mol, preferably from 500 to 2000 g/mol.

The tackifier resin ought to be compatible with the elastomer block of the block copolymers. More preferably the tackifier resins comprise at least 75 wt % (based on the total tackifier resin fraction) of hydrocarbon resins or terpene resins or a mixture of the same. The tackifier resin component (b) of the PSA layer very preferably comprises at least 75 wt %, based on the tackifier resin component, of at least one tackifier resin which has a DCAP (diacetone alcohol cloud point) of at least −20° C., preferably at least 0° C., and a softening temperature (Ring & Ball) of at least 85° C., preferably at least 100° C., and at most +140° C.

Suitable tackifier resins, without wishing to impose any limitation, are apolar hydrocarbon resins, examples being hydrogenated and unhydrogenated polymers of dicyclopentadiene, unhydrogenated, partially, selectively or fully hydrogenated hydrocarbon resins based on C5, C5/C9 or C9-monomer streams, and polyterpene resins based on α-pinene and/or β-pinene and/or δ-limonene. Preferably in the invention, therefore, the tackifier resins comprise at least 75 wt % (based on the total tackifier resin fraction) of hydrocarbon resins or terpene resins or a mixture thereof. Aforesaid tackifier resins may be used either alone or in a mixture, with the skilled person for polyisoprene block copolymers and/or polydiene block copolymers selecting from the above-listed tackifier resins in accordance with commonplace guidelines for compatibility. For this purpose, for example, it is possible to consult a publication by C. Donker (C. Donker, Proceedings of the Pressure Sensitive Tape Council, 2001, pp. 149-164).

Rosins may likewise be employed alone or in mixtures of different rosins and/or hydrocarbon resins. Rosin in the sense of this invention is typically a compound in the above-described molar mass range (MW<5000 g/mol) which as structural elements include at least one structural unit originating from rosin, said unit being selected more particularly from abietic acid, neoabietic acid, palustric acid, dihydroabietic acid, dehydroabietic acid, pimaric acid, isopimaric acid, derivatives of these, and mixtures thereof. Very suitable examples include esters containing two, three, four or more rosin units. The tackifier resins may be hydrogenated, stabilized or disproportionate.

The fraction of tackifier resin component (b) in the PSA formulation is beneficial for the bond strength. Consequently the fraction of tackifier resin ought not to be too low.

Plasticizing Component (c)

Plasticizing Oil (c1)

The at least one plasticizing oil is a mineral oil more particularly selected from naphthenic and paraffinic mineral oils, or a mixture of different plasticizing oils. Mineral oils are the oils obtainable by distillation of petroleum, coal and/or optionally other fossil raw materials, and consist substantially of paraffinic (saturated chainlike hydrocarbons), naphthenic (saturated cyclic hydrocarbons) and aromatic (cyclic hydrocarbons with aromatic double-bond system) constituents. Mineral oils may additionally include alkenes (olefins) and also, depending on provenance, small, varying amounts of sulfur-containing and nitrogen-containing organic compounds. Regarding mineral oils, see also the observations in D. Satas (F. C. Jagisch, J. M. Tancrede in Handbook of Pressure Sensitive Adhesive Technology, D. Satas (ed.), 3. Edn., 1999, Satas & Associates, Warwick, Rhode Island, chapter 16, pp. 377-379).

The aromatic fractions in mineral oils used in the invention ought advantageously not to be too high (preferably <5%, more preferably <2%, the aromatic fraction very preferably being 0%) so that they are compatible with the soft blocks of the elastomers and substantially incompatible with the vinylaromatic hard blocks of the elastomers. Very suitable, for example, are highly refined mineral oils such as white oils. In principle it is possible to use both technical and medical white oils, the latter in particular in accordance with the provisions of the European Pharmacopeia, 9th edition. These medical white oils are colorless, odorless and tasteless; they no longer contain any aromatics or sulfur compounds.

Mineral-oil plasticizers have a glass transition temperature of at most −25° C., preferably of at most −50° C. Their melt viscosity at 25° C. and 1 Hz is below 2 Pa*s, more particularly at most 1 Pa*s and very preferably at most 0.5 Pa*s. The peak molar mass of such plasticizing resins is typically above 500 g/mol and below 2000 g/mol.

Non-Mineral-Oil Plasticizers (Plasticizing Resins) (c2)

The optionally employable plasticizing resin or plasticizing resin mixture offers further formulation possibilities for establishment of a desired cohesion/adhesion balance. The resin typically has a softening temperature of <30° C. (Ring & Ball), and very preferably is a plasticizing resin or plasticizing resin mixture having a melt viscosity at 25° C. and 1 Hz of at least 2 Pa*s or at least 20 Pa*s or even at least 50 Pa*s. The peak molar mass of such plasticizing resins is typically above 200 g/mol and below 1500 g/mol or even below 1000 g/mol. Peak molar masses below 800 g/mol, in particular, are advantageous. The plasticizing resin may preferably be a hydrocarbon-based or polyterpene-based plasticizing resin. In relation to the overall adhesive, the plasticizing resin or plasticizing resin mixture is employed with a fraction of 0 wt % to 32 wt %, preferably of at least 5 wt % and at most 28 wt %, very preferably at least 10 wt % to at most 22 wt %.

Optional Further Constituents/Additives

Further to components (a), (b) and (c), the adhesive (100%) additionally contains 0 to 18 wt %, preferably up to 10 wt %, of further additives.

For this purpose inhibitors in particular may be added as further additives to the adhesive. These include aging inhibitors of primary and secondary types, light stabilizers and UV stabilizers, and also flame retardants, and also fillers, dyes and pigments. The layer of adhesive accordingly may be colored or white, gray or black.

Typical candidates for utilization as further additives of these kinds or others are as follows:
  primary antioxidants such as, for example, sterically hindered phenols,
  preferably with a fraction of 0.2 to 1 wt %, based on the total weight of the PSA,
  secondary antioxidants, such as, for example, phosphites or thioethers,
  preferably with a fraction of 0.2 to 1 wt %, based on the total weight of the PSA,
  process stabilizers such as, for example, C-radical scavengers,
  preferably with a fraction of 0.2 to 1 wt %, based on the total weight of the PSA,
  light stabilizers such as, for example, UV absorbers or sterically hindered amines,
  preferably with a fraction of 0.2 to 1 wt %, based on the total weight of the PSA,
  processing assistants,
  preferably with a fraction of 0.2 to 1 wt %, based on the total weight of the PSA,
  end-block reinforcer resins,
  if desired preferably with a fraction of 0.2 to 10 wt %, based on the total weight of the PSA, and
  optionally further polymers preferably elastomeric in nature; elastomers utilizable accordingly include, among others, those based on pure hydrocarbons, examples being unsaturated polydienes such as natural or synthetically generated polyisoprene or polybutadiene, chemically substantially saturated elastomers such as, for example, saturated ethylene-propylene copolymers, α-olefin copolymers, polyisobutylene, butyl rubber, ethylene-propylene rubber, and also chemically functionalized hydrocarbons such as, for example, halogen-containing, acrylate-containing, allyl or vinyl ether-containing polyolefins, preferably with a fraction of 0.2 to 10 wt %, based on the total weight of the PSA.

The nature and amount of the blend components may be selected in accordance with requirements, and the components may also be present at levels higher than the preferred upper levels. It is also in accordance with the invention for the layer of adhesive not to contain some or indeed all of the stated adjuvants in each case.

The adhesive may also be made foamable, in particular by the addition thereto of microballoons or by foaming, either by means of expanded microballoons or otherwise.

Adhesive Tape of the Invention

As set out earlier, the adhesive of the invention is outstandingly suitable for adhesive transfer tapes, these being, in particular, one-layer layers of adhesive (carrier-free systems) and also for adhesive tapes having carrier layers, specifically both single-sided adhesive tapes and double-sided adhesive tapes.

For typical adhesive transfer tapes which are advantageous in the invention, the layer of adhesive has adhesive surface weights for example in the range from 30 to 100 g/m2, thus present for instance as a layer on a temporary liner. In the case of the adhesive with additives (see also above), the surface weights may need to be adapted accordingly.

For single-sided adhesive tapes as well which have a carrier, such as, for example, a paper or a foil made of polyethylene, polypropylene, polyethylene terephthalate or another plastics material, adhesive layer surface weights of 30 to 100 g/m2 are advantageous, although higher or lower surface weights may also be selected depending on intended application. As described, the layer of adhesive may lie directly on the carrier. The single-sided adhesive tape may have further layers, which may be disposed on the side of the carrier facing away from the layer of adhesive, and/or else between the layer of adhesive and the carrier.

Double-sided adhesive tapes have two external layers of adhesive, of which one or both of the layers of adhesive independently of one another may advantageously have surface weights of 30 to 100 g/m2. Here as well it is the case, independently for both layers of adhesive, that higher or lower surface weights may also be favorable. Double-sided adhesive tapes may consist of only two layers of adhesive, or else may have further layers in between. Arranged between the external layers of adhesive there is preferably a carrier, composed for instance of the materials described for single-sided adhesive tapes. As compared with the layers of adhesive, such carrier layers may be thin; typical paper carriers, for example, have basis weights of 19 g. Here again, there may be further layers in the adhesive tape.

Symmetrical adhesive tapes or asymmetrical adhesive tapes, for geometry and/or composition of the respective layers, are advantageously realizable.

In the invention, in a particular advantageous way, an adhesive tape is provided comprising at least one upper external layer of adhesive, formed of an adhesive of the invention; a lower layer of adhesive, which initially in principle may be any adhesive; and, between the upper and the lower layers of adhesive, at least one dividable layer or dividable layer arrangement (referred to hereinafter collectively as "layer systems").

As introduced in the outset, the term "dividable" refers to those carriers which can be split parallel to their superficial extent, and more particularly those carriers which also actually split relative to the requirements in a splicing method. Expanding on this definition, however, the invention considers all layer systems to be dividable if they are capable of enabling parting of the adhesive tape in the area, in other words not only carrier layers which split in the area, but also layer laminates which have a correspondingly low cohesion, or layers which detach from further layers of the adhesive tape, including, for instance, one of the layers of adhesive, and so separate the adhesive tape into two layers. A common factor of the dividable layer systems is that their cohesion (their parting force) is sufficiently great to keep the adhesive tape together until the parting (splitting of the adhesive tape) is intended in the application.

The coat weight selected for the upper adhesive is typically in a range from 30 to 100 g/m2, more particularly in a range from 35 to 70 g/m2. Owing to the high tack, adhesives of the invention are also very suitable for relatively low coat weights, such as from about 5 g/m² to below 30 g/m², for example.

Dividable layers may be for instance—as already mentioned—"single-layer" carrier layers dividable in the area, such as paper layers, or laminates of two layers which can be parted from one another, or layer assemblies held together by laminating, coating or adhesive compounds (as described in EP 2 116 581, for instance), or else those held together by a synthetic polymer layer or coating layer which detaches from a carrier layer—such as foil or paper (compare, for the principle of the aforementioned examples, for instance EP 1 076 026 A and EP 2 116 581 A).

As used consistently within this specification, the characterization of layers of adhesive as external layers of adhesive does not rule out their temporary, protective lining with a liner. In that case the liner is removed prior to the application.

Suitable dividable layer systems include in particular all dividable sheet-like layer materials and layer assemblies, particularly readily splitting papers, paper composite systems (for example, duplex papers and sized paper systems), foil composite systems (sized foil systems, for example), polymeric composite systems (coextruded polymeric composite systems, for example), and polymeric nonwovens.

Employed typically is a layer system wherein the splitting force amounts in total to 5 to 70 cN/cm, more particularly 6 to 60 cN/cm. These values refer to the force determined using the test method as set out in EP 3 173 452 A, paragraph [0081] (measurement method), in conjunction with paragraph [0079] (sample preparation) and with FIG. 2 therein, where it is referred to as split propagation force.

Particularly for product constructions with a dividable layer system, the invention prefers the upper adhesive and the lower adhesive to have sufficiently high peel adhesion. More particularly the peel adhesion of these adhesives on the respective surfaces (carrier and web material to be bonded) ought to be greater than the force required for splitting of the dividable layer system. In principle, the upper adhesive and the lower adhesive selected may also be identical, as already observed in more detail earlier on above.

Figure 1:
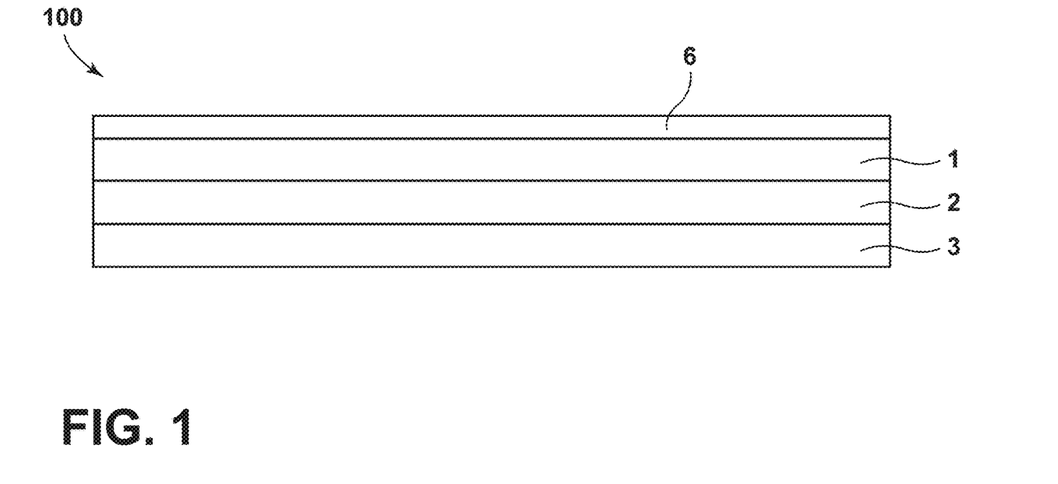
FIG. 1 shows a schematic side representation of one embodiment of an adhesive tape of the invention (three-ply construction, shown transverse to the longitudinal direction of the adhesive tape)

The constructions of the adhesive tapes of the invention may be realized in different embodiments. Reference may be made in particular to the following specifications, the disclosure content of which are hereby incorporated in full into the disclosure content of this specification:

DE 196 32 689 A2 (Beiersdorf), especially the construction as per FIG. 1 and the explanations in column 3 lines 31 to 44, where the adhesive arranged at the top (3; between carrier 2 and liner 4), and possibly also the lower adhesive (likewise denoted by 3), is or are substituted by the present adhesive of the invention, DE 199 02 179 A1 (Beiersdorf), especially the construction as per FIG. 1 and the explanations in column 3 lines 31 to 44, where the adhesive N1 therein, and also optionally the adhesive N3 therein, is or are substituted by the present adhesive of the invention, and where the adhesive N2 therein may also be substituted by the present adhesives of the invention, WO 91/08159 A1 (Norrman), especially the construction as per FIG. 1 and the explanations at page 2 line 35 to page 4 line 14, where adhesive 3 therein, and optionally also adhesive 4 therein, is or are substituted by the present adhesive of the invention, DE 198 41 609 A1 (Prinz), especially constructions as per FIG. 1 and the explanations at column 3, line 7 to line 37, where adhesive 34 therein, and optionally also adhesive 32 therein, is or are substituted by the present adhesive of the invention, US 2004/0075014 A1 (Jacobs et al.), especially constructions as per FIG. 1 and the explanations in paragraphs [0049] to [0054], where adhesive 3 therein, and optionally also adhesive 2 therein, is or are substituted by the present adhesive (3, 13) of the invention, US 2005/0126688 A1 (Bean et al.), especially constructions as per FIGS. 2a, 2b, 2c and 2d and the explanations in paragraphs [0024] to [0037], where adhesives 20 and 20a therein, and optionally also adhesives 30a and 30b/30c therein, are substituted by the present adhesive of the invention, U.S. Pat. No. 6,432,241 B1 (Congard et al.), especially constructions as per FIGS. 1 and 2 and the explanations in column 3 lines 52 to 64 and column 4 line 34 to column 6 line 53, where the adhesives 12 therein, and optionally also adhesive 15 therein, are or is substituted by the present adhesive of the invention, US 2002/0056784 A1 (Davies et al.), especially the construction as per FIG. 2 and the explanations in paragraphs [0038] to [0052], where the adhesives 16 therein, and optionally also adhesive 24 therein, are or is substituted by the present adhesive of the invention, EP 2 130 886 A (tesa SE), especially FIGS. 1, 2, 3 and 4, and the explanations more particularly in paragraph [0022] (where they erroneously relate to FIGS. 1a to 1d, with FIG. 1a=FIG. 1, FIG. 1b=FIG. 2, FIG. 1c=FIG. 3 and FIG. 1d=FIG. 4), where the upper adhesive 3 therein, and optionally also the lower adhesive 3' therein, is or are substituted by the present adhesive of the invention, EP 2 130 887 A, EP 2 130 888 A and EP 2 130 889 A, especially in each case figures therein and the relevant explanations in the disclosure, where the adhesive M therein, and optionally also the adhesives $M_O$ and/or $M_U$, is or are substituted by the present adhesive of the invention, but without wishing to impose any unnecessary restriction by the reference to the abovementioned embodiments in the invention.

It is in particular also of advantage if the adhesive tape comprises a non-dividable carrier whose upper side is coated with the adhesive of the invention and whose lower side is joined entirely or at least partly to the upper side of the dividable layer system. By using a non-dividable carrier which joins the web of the old roll to the web start of the new roll before and also after the splitting of the dividable layer system, a particularly robust connection between the two rolls is achieved, and the efficiency of the splicing method is boosted further. It is especially advantageous here if the lower side of the non-dividable carrier is joined (wholly or partly) to the upper side of the dividable layer system by way of a connecting adhesive (five-ply construction, if the dividable layer system is a single layer or is interpreted as such a layer). This connection may in principle be produced in any desired way, as for example with an adhesive, with a curing hotmelt adhesive, and the like. Here as well an adhesive of the invention may be advantageously used.

Through use of a mechanically stable non-dividable carrier, the efficiency of the bonding of the web of the old roll to the web start of the new roll is greatly increased in the splicing method. As main carrier it is possible to use all typical sheetlike carrier materials for adhesive tapes, examples being paper carriers of smooth base paper coated on one or both sides, and also foil carriers, for instance BOPP foils, PET foils, aluminized PET foils, and aluminum foils. It is desirable here for the main carrier to be tear-resistant. As a connecting adhesive it is possible to use any desired typical adhesive. It is useful if the connecting adhesive selected is a resin-modified acrylate compound, since in this case the risk of blocking of the dividable layer system is particularly small. For the connecting adhesive as well, however, it is also possible in principle to use the adhesive of the invention, or a different adhesive.

The adhesive tape accordingly has a dividable carrier over the entire length of the bond and also over the entire length of the adhesive tape. The dividable carrier may extend over the entire width of the non-dividable carrier. It is useful, however, if the width of the dividable carrier is less than the overall width of the adhesive tape, so that fastening to the underlying web is achieved only in a small part of the tape width. It is particularly useful here if the dividable carrier does not finish flush with the non-dividable carrier, but is instead secured to the lower side thereof with an indent relative to said carrier. As a result, in the splicing method, the risk of occurrence of tears is reduced still further. The indentation in advantageous configurations amounts for example to 2±1 mm, but may also be selected to be greater or smaller.

In a further embodiment according to the invention, the adhesive tape is a double-sided adhesive tape having at least three layers, of which the upper and lower layers are a layer of adhesive, with a carrier layer disposed between them. The carrier layer in this variant is not dividable. The materials in question may be foils, of the kind known from the prior art as carrier material for double-sided adhesive tapes. Selected very advantageously are polyester carriers, such as polyethylene terephthalate (PET), or polyolefin carriers, such as more particularly biaxially oriented polypropylene (BOPP). At least one of the two layers of adhesive, and in particular the top one, and very preferably both, consist of an adhesive of the invention. In order to optimize the anchoring of the layer or layers of adhesive on the carrier material, the latter may have undergone chemical and/or physical pretreatment and/or coating. In these cases as well it is useful to provide release liners in order to line one or both layer(s) of adhesive.

The invention also extends, furthermore, to adhesive tapes which contain no carrier layer—that is, to what are called adhesive transfer tapes. With these tapes there is a layer of the adhesive of the invention on a release liner.

The invention further embraces the use of the adhesive tape of the invention for bonding flat web material having apolar surfaces wound into rolls, in the course of a flying splice, particularly for bonding foils and/or nonwovens, but also papers, especially those with apolar coats (coated papers are papers for which the surface has been finished with an application of binder—this being, indeed, the "coat"), or on highly sized papers. Using the adhesive has the effect overall of a significant boost to the efficiency of the splicing method.

The invention lastly affords a splicing method for the flying splice of apolar flat web material wound into rolls, more particularly of foils and/or nonwovens, where the adhesive tape of the invention is adhered (at least partly) behind the end of the topmost web of a new roll of an apolar flat web material, while the lower side of the adhesive tape is bonded to the underlying web of the new roll, which is secured as a result, after which the new roll thus furnished is placed next to an almost fully depleted roll to be replaced, and is accelerated to the same superficial velocity, and then the new roll is pressed against the topmost web of the old roll, with the exposed adhesive of the adhesive tape bonding to the old web while the webs are at substantially equal velocities, while at the same time the dividable system splits and non-adhesively covers the adhesives of the dividable system with the two split remnants of the dividable carrier.

Figure 2:
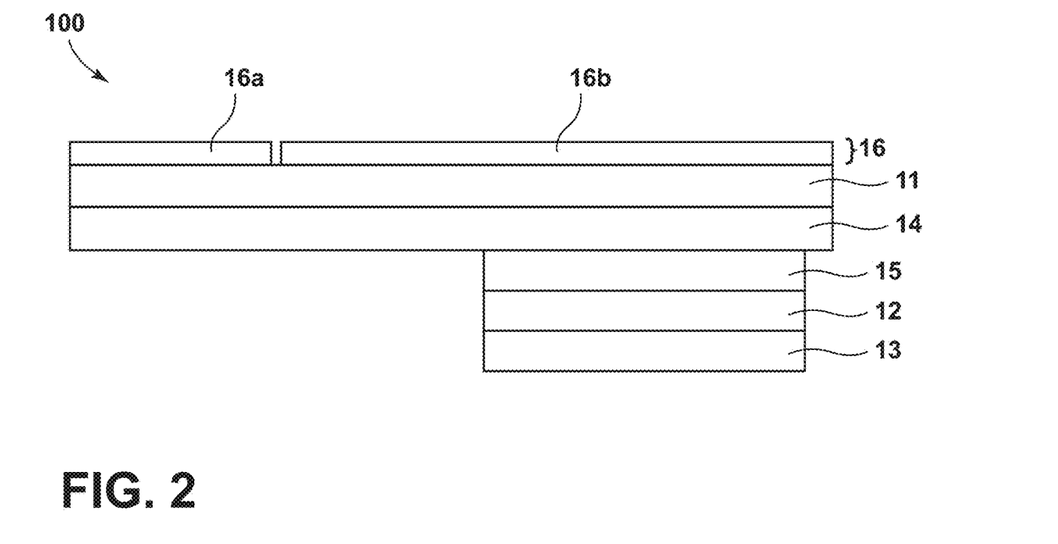
FIG. 2 shows a schematic side representation of a further embodiment of an adhesive tape of the invention (five-ply construction, shown transverse to the longitudinal direction of the adhesive tape)

The invention is described in more detail below with reference to the diagrams, wherein FIG. 1 shows a schematic side representation of one embodiment of an adhesive tape of the invention (three-ply construction, shown transverse to the longitudinal direction of the adhesive tape), and FIG. 2 shows a schematic side representation of a further embodiment of an adhesive tape of the invention (five-ply construction, shown transverse to the longitudinal direction of the adhesive tape).

Represented in FIG. 1 is an adhesive tape 100 of the invention which is suitable for the flying splice of flat web material having apolar surfaces and wound into rolls. The adhesive tape 100 is embodied as a three-ply construction composed of carrier 2, which may be dividable or non-dividable, which is coated on its upper side with the upper adhesive 1 and on its lower side with the lower self-adhesive layer 3. Where carrier 2 is a dividable carrier, a construction of this kind can be employed in particular if the dividable carrier 2 along its superficial extent, has sufficient mechanical robustness to be able to withstand the loads which occur when the web of the almost depleted roll is joined to the web start of the new roll.

The adhesive tape 100 additionally comprises a release system 6 for the non-adhesive lining of the upper adhesive 1, thereby protecting the adhesive upper side of the adhesive tape during storage. Release systems which can be used are all conventional release papers or other antiadhesive or anti-adhesive coated materials, such as siliconized release papers or siliconized release foils. The release system 6 here may have a one-part or multipart (not represented in FIG. 1) configuration.

Represented in FIG. 2 is a further particularly useful embodiment of an adhesive tape 100 of the invention, as a five-ply construction. This embodiment of the adhesive tape system comprises a dividable carrier 12 and a non-dividable carrier 14, which are joined to one another. The joint here is made in the form of a separate, connecting adhesive 15, which joins the upper side of the dividable carrier 12 to a part of the lower side of the non-dividable carrier 14. Accordingly the non-dividable carrier 14 is coated with the upper adhesive 11 on its upper side and with the connecting adhesive 15 on a part of its lower side, the latter adhesive anchoring the dividable carrier 12 on the non-dividable carrier 14. The dividable carrier 12 in this case is arranged with a lower adhesive 13 on its lower side, and with an offset or indentation relative to the non-dividable carrier 14.

Furthermore, the embodiment represented in FIG. 2 additionally has a release system 16 for the non-adhesive lining of the upper adhesive 11, for which all conventional release papers may be used, such as siliconized release papers or siliconized release foils. Particularly advantageous is the two-part release system 16a/16b represented here, which is divided in longitudinal direction into a rear lining part 16a and a front lining part 16b, by means of a perforation or a slit, for instance. An advantage of this is that the adhesive tape can first be bonded to the web start of the new roll, for which merely the adhesive region of the adhesive tape is exposed below the rear lining part 16a, and the adhesive region, for bonding to the web of the old roll, continues to be lined by the front lining part 16b and therefore remains protected.

References

Solely from the statement of the respective measurement methods it is not possible to conclude that all of the parameters specified below are relevant for the present specification and the invention depicted.

All statements regarding the glass transition temperature in the context of this specification relate to the glass transition temperature value Tg of the DSC measurement (dynamic scanning calorimetry) according to DIN 53765:1994-03, unless indicated otherwise in the specific instance.

Data relating to the peak molar masses, to number-average molar mass Mn and also to the weight-average molar mass Mw, insofar as they are mentioned in this specification and there is no indication otherwise specifically, relate to the determination by gel permeation chromatography (GPC). The eluent used is THF. The measurements are made at 23° C. The precolumn used is PSS-SDV, 5 µ, $10^3$ Å, ID 8.0 mm×50 mm. Separation is carried out using the columns PSS-SDV, 5 µ, $10^3$ Å and also 104 Å and 106 Å each of ID 8.0 mm×300 mm. The sample concentration is 4 g/l, the flow rate 1.0 ml per minute. Measurement is made against PS standards (µ=µm; 1 Å=10–10 m).

GPC is an appropriate metrological method for determining the molar mass of individual polymer modes in mixtures of different polymers. For the block copolymers which can be used for the purposes of this invention, which are prepared by living anionic polymerization, the molar mass distributions typically are sufficiently narrow, allowing polymer modes assignable to triblock copolymers, diblock copolymers or multiblock copolymers to appear in the elugram with sufficient resolution from one another. It is then possible to read off the peak molar mass for the individual polymer modes from the elugram.

Where indicated in this specification, diacetone alcohol cloud point (DACP) values relate to the following method of determination: 5.0 g of test substance (the tackifying resin specimen under investigation are weighed out into a dry test tube), and 5.0 g of xylene (isomer mixture, CAS [1330-20-7], ≥98.5%, Sigma-Aldrich #320579 or comparable) are added. The test substance is dissolved at 130° C. and the solution is then cooled to 80° C. Any xylene which has escaped is made up with further xylene, so that again 5.0 g of xylene are present. Then 5.0 g of diacetone alcohol (4-hydroxy-4-methyl-2-pentanone, CAS [123-42-2], 99%, Aldrich #H41544 or comparable) are added. The test tube is shaken until the test substance is fully dissolved. The solution is heated for the purpose to 100° C. The test tube with the resin solution is subsequently introduced into a Chemotronic Cool cloud point meter from Novomatics, where it is conditioned to 110° C. Cooling takes place at a cooling rate of 1.0 K/min. The cloud point is detected optically. This is done by recording the temperature at which the clouding of the solution amounts to 70%. DAPC values are reported in ° C. The lower the DACP, the higher the polarity of the test substance.

Softening temperatures for resins, especially tackifier resins, are determined by the Ring & Ball method according to ASTM E28 and are reported relatively thereto.

Data regarding the melt viscosity of mineral-oil plasticizers and non-mineral-oil plasticizers (plasticizing resins) relate to the following measurement: a shear stress sweep is performed in a shear stress-regulated DSR 200 N rheometer from Rheometrics Scientific in rotation. The measuring system used is a cone/plate system having a diameter of 25 mm (cone angle 0.1002 rad); the measurement head is air-mounted and suitable for normal force measurements. The gap is 0.053 mm and the measuring temperature is 25° C. The frequency is varied from 0.002 Hz to 200 Hz and the melt viscosity is reported at 1 Hz.

The fraction of conjugated diene in the blocks of vinylaromatic block copolymer (also called vinyl fraction) may be determined by means of 1H NMR. Spectroscopic analysis takes place using the following instrument: 1H-NMR: Bruker AMX 500 (500.14 MHz). The standard used was the solvent signal δ (CHCl3)=7.24 ppm. The chemical shifts are always reported in ppm. The coupling constants J are reported in Hertz [Hz]. The signal patterns are reported as follows: s (singlet), bs (broad singlet), d (doublet), dd (doublet of a doublet), t (triplet), q (quintet), m (multiplet).

Experiments

The invention is illustrated in more detail below with reference to a number of experiments, without wishing to impose any unnecessary restriction by the choice of the experiments and embodiments investigated.

TABLE 1

Raw materials used

|  | Type |  | Manufacturer |
|---|---|---|---|
| Elastomers | Kraton ® D1118 | Polystyrene-polybutadiene block copolymer (78% diblock as per manufacturer data) | Kraton Performance Polymers |
|  | Globalprene ® 5517 | Polystyrene-polyisoprene block copolymer (38% diblock as per manufacturer data) | LCY |
| Tackifier resins | Dercolyte A115 ® | Polyterpene resin | DRT |
| Plasticizers | Wingtack ® 10 | C5 resin | Cray Valley |
|  | Pionier ® 2070P | White oil | Hansen und Rosental KG |
| Aging inhibitor | Irganox ® 1010 | Sterically hindered phenol | BASF |
| Plasticizer (for comparative experiments) | Foralyn ™ 5020-F | Hydrogenated rosin ester (aromatic plasticizer) | Eastman |

Production of the Samples Investigated:

The raw materials (see Table 1 above) were placed into a glass vessel in accordance with the composition as indicated in Tables 2a and 2b below. For this purpose a solvent mixture of toluene, benzene and acetone (in a mixing ratio of 30:56:14) was added, to give a solids content of 40 wt %. The raw materials were subsequently subjected to a dissolution procedure on a roller bed for at least 2 days.

The adhesive solutions thus dissolved were coated using a Zentner coating bench onto a siliconized release paper, and dried, to give an adhesive layer thickness in the dried state of 55 g/m². Drying took place in a drying oven at a temperature of 120° C. for a time of 20 minutes.

Subsequently, in order to produce what is called a swatch specimen—a 36 µm PET foil was laminated onto the adhesive, using a rubber roller.

For the investigation methods of the PA PE 180° test, RBT test method and SAFT test method (see below), the swatch specimen was made up as indicated in each case, the release paper was removed, and measurement took place on the side thus exposed ("test side").

For the LSM test method (see below), the swatch specimen was processed further as indicated below.

Investigation Methods

Test PA PE 180°: Peel Adhesion on Polyethylene; Peel Angle 180°

The peel adhesion on polyethylene was determined under test conditions of 23° C. +/−1° C. temperature and 50%+/−5% relative humidity. The specimens were trimmed to a width of 20 mm and adhered with the test side onto a polyethylene plate (PE plate). Prior to the measurement, the PE plate was cleaned and conditioned, by cleaning it with isopropanol and cotton and then leaving it to lie in the air for 2 h to allow the solvent to evaporate. Thereafter the test specimen was rolled onto the test substrate. This was done by rolling the tape down with a 4 kg roller fives time back and forth with a rolling speed of 10 m/min. The peel adhesion was measured with a Zwick tensile testing machine at an angle of 180° and a velocity of 300 mm/min.

The results are reported in N/cm and have been averaged from three individual measurements. The test is passed in the sense of the object specified in the invention when the peel adhesion on polyethylene Fp is ≥2 N/cm.

Rolling Ball Tack (RBT) Test Method

The tack for the adhesive was determined using the RBT test method, as follows:

As a measure of the tack in a very short contact time, a measurement was made of what is called the rolling ball tack. A strip of the sample about 10 cm long was secured horizontally on the test plane such that the exposed test side faced upward. A steel sample ball (diameter: 11 mm; mass: 5.6 g) was cleaned with acetone and conditioned for 2 h under ambient conditions (temperature: 23° C.+/−1° C.; relative humidity 50%+/−1%). For the measurement, the steel ball was accelerated by being rolled down a 65 mm high ramp (angle of inclination: 21°) in the Earth's gravitational field. From the ramp, the steel ball was guided directly onto the adhesive surface (test side) of the sample. The pathway traveled on the adhesive until the ball came to a stop was measured. The roll path length determined in this way is used here as an inverse measure of the tack of the self-adhesive compound (i.e., the shorter the roll path, the greater the tack, and vice versa).

The respective measurement (as a length datum in mm) was obtained from the average value of five individual measurements. The test is passed in the sense of the object set in the invention if the roll path length l is ≤25 mm, preferably l≤15 mm.

Shear Adhesion Failure Test (SAFT) Test Method: Thermal Shear Strength

The SAFT test is used for rapid testing of the shear strength of adhesive tapes under temperature load. It involves the sample under investigation being adhered by the test side to a temperature-controlled steel plate, loaded with a weight (50 g), and with the shear distance recorded.

Preparation of Samples for Measurement:

An adhesive tape sample, trimmed to 10 mm*50 mm, is bonded by the other side of its adhesive to a polished steel test plate (material 1.4301, DIN EN 10088-2, surface 2R, surface roughness Ra=30 to 60 nm, dimensions 50 mm*13 mm*1.5 mm) cleaned with acetone, the bond being made such that the bond area of the sample in terms of height*width=13 mm*10 mm and the steel test plate overhangs at the upper edge by 2 mm. Fixing is then performed by rolling down with a 2 kg steel roller at a speed of 10 m/min six times. The sample is reinforced at the top flush with a stable adhesive strip, which serves as a support for the travel sensor. The sample is then suspended using the steel plate such that the longer-protruding end of the adhesive tape points vertically downward.

Measurement:

The sample for measurement is loaded at the lower end with a weight of 50 g. The steel test plate with the bonded sample is held at 30° C. for 5 minutes and then heated at a rate of 9 K/min (maximum final temperature 200° C., if the sample does not shear off before).

Result:

The result reported is the temperature on attainment of a shear travel of 1000 μm. If a temperature of 200° C. is reached before the shear travel is 1000 μm, the length of the shear travel at 200° C. is reported and the measurement is ended. The result reported is the average value from two measurements taking place in parallel. The test is considered to be passed in the sense of the object set in the invention if the temperature (T) on attainment of a shear travel of 1000 μm is T≥90° C., preferably T≥100° C.

LSM Test Method: Performance Test on the Laboratory Splicing Machine (LSM)

Figure 3:
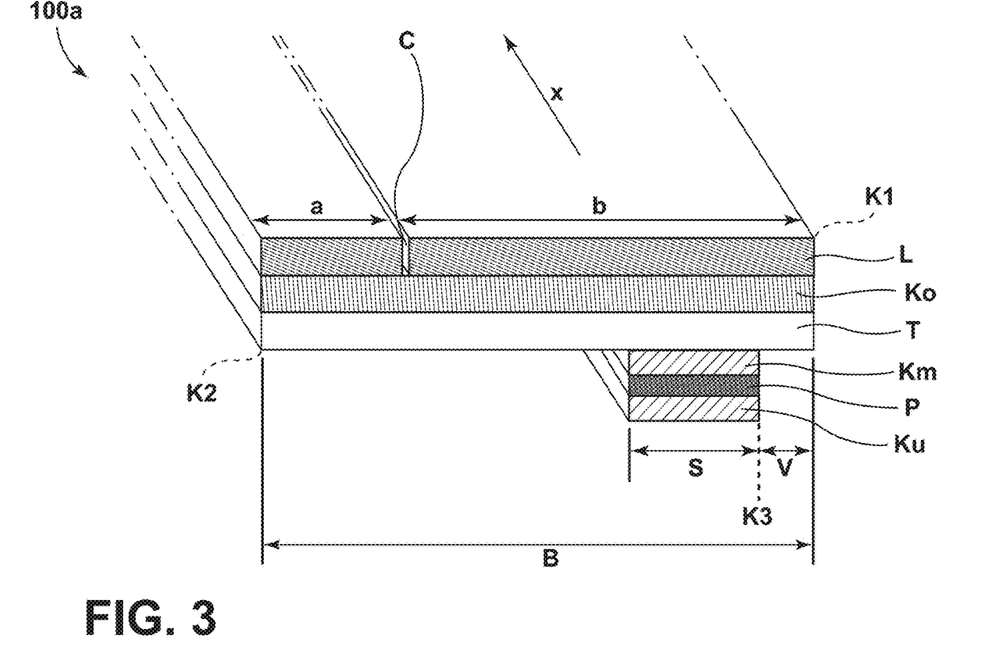
FIG. 3 shows a cross section through the adhesive tape, and the length of the adhesive tape extends in the direction perpendicular to the plane of the paper (shown schematically in perspective as the x-direction)

The LSM test method is carried out with a sample adhesive tape which has a construction as shown in FIG. 3 and corresponds essentially to the construction in FIG. 2. FIG. 3 shows a cross section through the adhesive tape 100, and the length of the adhesive tape extends in the direction perpendicular to the plane of the paper (shown schematically in perspective as the x-direction in FIG. 3).

Referring to FIG. 3, from the swatch specimen (adhesive tape 100) produced as described above, a strip 100a having a width B of 50 mm was cut, consisting of the PET film as carrier layer T, the adhesive layer Ko and the liner L, with this adhesive tape having two long edges K1 and K2. The liner L is adhered by a longitudinal cut C into two individually removable parts, with the width a=18 mm between the first adhesive tape long edge K1 and the long longitudinal cut C, and the width b=32 mm between the longitudinal cut C and the second adhesive tape long edge K2.

On the exposed PET foil side, a double-sided adhesive tape, consisting of a two-dimensionally dividable paper carrier P, a lower adhesive layer Ku and an adhesive layer Km, facing the PET carrier, was adhered beneath in longitudinal direction such that its one long edge K3 is disposed at a distance V from the adhesive tape long edge K1.

Further, sections 40 cm in length were separated off from this adhesive strip 100a shown in FIG. 3.

The dividable paper carrier has a splitting force (split propagation force in the sense of EP 3 173 452 A, paragraph [0081], see also above) of 20 cN/cm. The adhesives used for the layers Mm and Ku are conventional rubber adhesives with a peel adhesion such that in the subsequent course of the experiment, there is no detachment of these peel adhesions from the substrates on which they are bonded (sample substrate on the roll surface of the feed roll, paper carrier or PET foil), and also no cohesive fracture within these layers.

Figure 4:
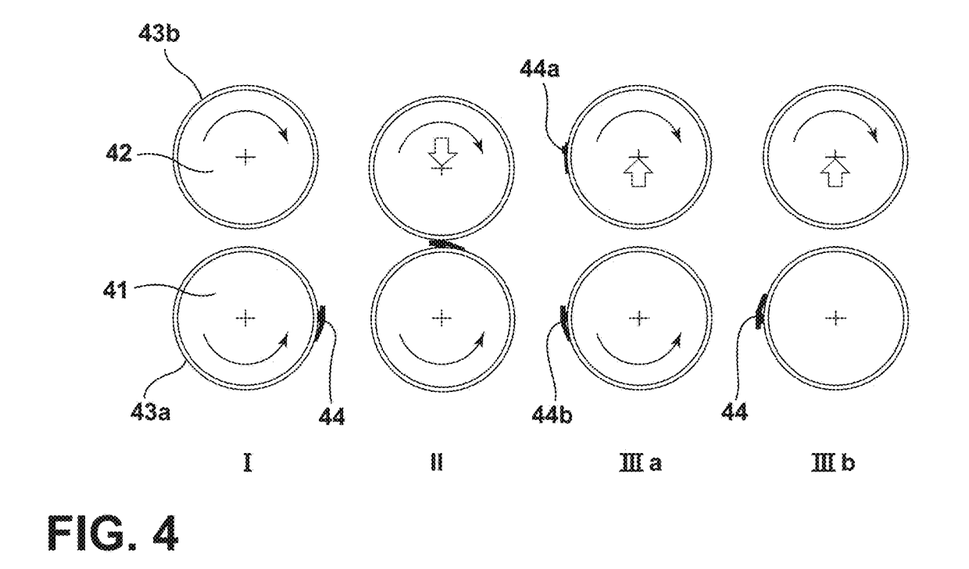
FIG. 4 shows a cross section of a laboratory splicing machine consisting of two axially parallel rollers, with an adhesive strip section as produced and shown in FIG. 3, with the adhesive adhered to the surface of the sample substrate.

The performance tests (splicing tests) were carried out on a laboratory splicing machine (LSM), shown schematically in FIG. 4 and consisting of two axially parallel rollers 41, 42, which can be rotated in opposite directions at synchronized speed and can be moved relative to one another (reduction in the axial distance until the roll surfaces make contact). Both rolls 41, 42 have a diameter of 600 mm and a width of 600 mm; both rolls 41, 42 possess a rubberized surface, the first of the rolls—feed roll 41—having a Shore hardness (Shore A) of 80, the second of the rolls—pressing roll 42—having a Shore hardness (Shore A) of 50 (based in each case on DIN ISO 7619-1 (2012-02), with 3 s pressing time). A ply of the sample substrate 43a, 43b is applied flush on both roll surfaces and pulled on such that it adheres firmly. The sample substrate 43a, 43b used was an LDPE foil (low-density polyethylene); high-slip additives (lubricant additions: erucamide) were detected analytically; surface energy of the sample substrate is 32 mN/m.

An adhesive strip section 44 as produced above with a configuration consistent with adhesive tape 100a (as shown in FIG. 3), with the adhesive Ku (cf. FIG. 3), was adhered to the surface of the sample substrate 43a, which was on the feed roll 41, such that the edges of the section 44 running in the longitudinal direction, and hence also the dividable strip, extended at an angle of not more than 5° to the axial direction of the feed roller 1, specifically in such a way that the edge K2 (cf. FIG. 3) was arranged counter to the direction of rotation of the feed roll 41 (cf. FIG. 4I). The narrower portion (width a in FIG. 3) of the liner L (cf. FIG. 3) was removed from the adhesive strip section 44, and the end of the adhesive tape was secured in the region of the edge K2 to a weakly pressure-sensitive adhesive tape (not shown separately in the schematic FIG. 4) on the sample substrate surface 43a, with the peel adhesions of the weakly pressure-sensitive adhesive tape having been adjusted such that on the one hand there was no flapping flag when the feed roll 41 was rotated (that is, the end of the adhesive tape was held firmly on the surface 43a), but that, in the case of a positive experimental process, the immediate detachment of the weakly adhering adhesive tape from the surface 43a was ensured. The longer portion (width b in FIG. 3) of the liner L (cf. FIG. 3) was then removed, exposing the underlying surface of the adhesive layer Ko.

Both the rolls 41, 42 were brought, in opposite directions, to a rotational velocity of 1000 m/min (cf. curved arrow in FIG. 4). The pressing roll 42 was then moved in the direction of the feed roll 41 in such a way as to result in an applied pressure of 200 N/m for exactly one roll circumferential length (FIG. 4II), with the adhesive tape 44 running once through the pressure point. Thereafter the rolls were moved apart from one another again (FIGS. 4IIIa and 4IIIb).

FIG. 4IIIa shows the positive experimental process if the adhesive of the layer Ko under investigation passes the test: the adhesive surface adheres strongly to the sample substrate surface 43b of the pressing roll 42, and so the paper carrier P (cf. FIG. 3) splits two-dimensionally and the adhesive tape part 44a, comprising the adhesive layer Ko, the carrier T, the adhesive layer Km and a fragmented layer of the paper layer P, remains on the pressing roll 42, while the adhesive tape part 4b, comprising the adhesive Ku and the second fragmented layer of the paper carrier P, remains on the feed roll.

FIG. 4IIIb shows the negative experimental process, if the adhesive of the layer Ko under investigation does not pass the test: the adhesive tape 44 does not adhere on the sample substrate surface 43b of the pressing roll 42, and the adhesive tape 44 remains on the feed roll 41.

The test conditions for all the tests are as follows: temperature 23±1° C.; 50±5% relative humidity, air pressure 1013±5 mbar, unless indicated otherwise.

Compositions and Results of the Investigations

TABLE 2a

| | | a) Inventive examples | | | | | |
|---|---|---|---|---|---|---|---|
| Raw materials [#] | * | B1 | B2 | B3 | B4 | B5 | B6 |
| Kraton ® D1118, SBS | (a) | 48 | 48 | 35 | 45 | 55 | 0 |
| Globalprene ® 5517, SIS | (a) | 0 | 0 | 0 | 0 | 0 | 48 |
| Dercolyte A115 ® | (b) | 25 | 32 | 25 | 40 | 21 | 35 |
| Wingtack ® 10 | (c2) | 0 | 10 | 21 | 0 | 16 | 0 |
| Pionier ® 2070P | (c1) | 27 | 10 | 19 | 15 | 8 | 17 |
| Aging inhibitor | | 1 | 1 | 1 | 1 | 1 | 1 |
| PA PE 180°, $F_K$ [N/cm] | | 2.14 | 4.80 | 2.78 | 5.74 | 3.28 | 2.50 |
| RBT, I [mm] | | 8 | 6 | 6 | 17 | 25 | 10 |
| SAFT, T [° C.] | | 105 | 107 | 94 | 105 | 111 | 95 |
| LSM ** | | p | p | p | p | p | p |

[#] Figures for the composition each in parts by weight. Based on the base adhesive composition composed of components (a), (b), (c1) and (c2), the parts by weight add up to 100. Aging inhibitors add to this additively.
* corresponding component of the base composition
** p: pass; f: fail; nc: not carried out TABLE 2b

| | | b) Comparative examples | | | | | |
|---|---|---|---|---|---|---|---|
| Raw materials[#] | * | VG1 | VG2 | VG3 | VG4 | VG5 | VG6 *** |
| Kraton ® D1118 | (a) | 40 | 42 | 60 | 48 | 35 | 45 |
| Dercolyte A115 ® | (b) | 45 | 48 | 16 | 25 | 25 | 25 |
| Wingtack ® 10 | (c2) | 15 | 0 | 0 | 0 | 40 | 30 |
| Foralyn ™ 5020-F | (c2) | 0 | 0 | 0 | 27 | 0 | 0 |
| Pionier ® 2070P | (c1) | 5 | 10 | 24 | 0 | 0 | 0 |
| Aging inhibitor | | 1 | 1 | 1 | 1 | 1 | 0 |
| Comments | | Inadequate fraction of component (c1) in component (c) | Inadequate fraction of component (c) | Components (a) and (b) in wrong fractions | | No (c1) | No (c1) | No (c1) |

TABLE 2b-continued

| | | b) Comparative examples | | | | | |
|---|---|---|---|---|---|---|---|
| Raw materials# | * | VG1 | VG2 | VG3 | VG4 | VG5 | VG6 *** |
| PA PE 180° [N/cm] | | 9.94 | 8.85 | 0.17 (!) | 3.24 | 10.92 | 7.11 |
| RBT [mm] | | 45 (!) | 38 (!) | 28 | 8 | 19 | 25 |
| SAFT [° C.] | | 102 | 103 | 115 | 81 (!) | 93 | 102 |
| LSM ** | | nc | nc | nc | nc | nc (!) | nc (!) |

Figures for the composition each in parts by weight. Based on the base adhesive composition composed of components (a), (b), (c1) and (c2), the parts by weight add up to 100. Aging inhibitors add to this additively.
* corresponding component of the base composition
** p: pass; f: fail; nc: not carried out
*** corresponding to adhesive from DE 10 2006 053 439 A. Deviations from values reported therein result from the use of a different sample carrier material (PET foil instead of paper)
(!) Result does not meet the requirements

The invention claimed is:

1. An adhesive tape, comprising:
at least first and second external layers of adhesive, wherein the first external layer of adhesive is an adhesive (I) comprising:
(a) 35 to 55 wt % of an elastomer component, the elastomer component comprising one or more polyvinylaromatic-polydiene block copolymers;
(b) 20 to 45 wt % of a tackifier resin component, the tackifier resin component comprising at least one tackifier resin having a diacetone alcohol cloud point (DACP) of at least −20° C. and a softening temperature (Ring & Ball) of at least 85° C.; and
(c) 15 to 40 wt % of a plasticizing component, wherein
(c1) 8 to 35 wt % of (c) comprises one or more plasticizing oils, and
(c2) up to 32 wt % of (c) comprises one or more non-mineral-oil plasticizers having a softening temperature of less than 30° C. (Ring & Ball);
wherein the second external layer of adhesive differs compositionally from the first external layer of adhesive.

2. The adhesive tape of claim 1, wherein the second external layer of adhesive also is an adhesive (I).

3. The adhesive tape of claim 1, wherein the one or more plasticizing oils comprises a mineral oil.

4. The adhesive tape of claim 1, wherein the one or more plasticizing oils comprises a naphthenic mineral oil, a paraffinic mineral oil, a medical white oil, or a combination thereof.

5. The adhesive tape of claim 1, wherein the one or more polyvinylaromatic-polydiene block copolymers is at least 90 wt %, as based on the (a) elastomer component.

6. The adhesive tape of claim 1, wherein the at least one tackifier resin is at least 75 wt %, as based on the (b) tackifier resin component.

7. The adhesive tape of claim 1, wherein the (b) tackifier resin component comprises one or more hydrocarbon resins, terpene resins, or a combination thereof, and further wherein the one or more hydrocarbon resins, terpene resins, or a combination thereof is at least 75 wt %, as based on the (b) tackifier resin component.

8. The adhesive tape of claim 1, wherein the one or more non-mineral oil plasticizers have a melt viscosity at 25° C. and 1 Hz of at least 2 Pa*s.

9. The adhesive tape of claim 1, wherein the adhesive (I) is a pressure-sensitive adhesive.

10. The adhesive tape of claim 1, wherein the polydiene blocks of the one or more polyvinylaromatic-polydiene block copolymers are formed by polymerization of one or more of butadiene, isoprene, ethylbutadiene, phenylbutadiene, piperylene, pentadiene, hexadiene, ethylhexadiene, and dimethylbutadiene.

11. The adhesive tape of claim 1, wherein the polydiene blocks of the one or more polyvinylaromatic-polydiene block copolymers are formed by polymerization of one or more conjugated dienes.

12. The adhesive tape of claim 11, wherein the one or more conjugated dienes comprises a 1,3-diene.

13. The adhesive tape of claim 1, wherein the polyvinylaromatic blocks of the one or more polyvinylaromatic-polydiene block copolymers are polystyrenes.

14. The adhesive tape of claim 1, wherein the one or more non-mineral-oil plasticizers comprises a hydrocarbon-based or polyterpene-based plasticizing resin.

15. The adhesive tape of claim 1, wherein 5 wt % to 28 wt % of the plasticizing component (c) comprises the one or more non-mineral-oil plasticizers (c2).

16. The adhesive tape of claim 1, wherein
at least one block copolymer of the elastomer component comprises a peak molar mass between 80,000 g/mol and 500,000 g/mol.

17. The adhesive tape of claim 1, wherein
the tackifier resin comprises a weight-average molecular weight that is within a range of from 500 g/mol to 2,000 g/mol.

18. The adhesive tape of claim 1 further comprising:
up to 10 wt % additives.

19. An adhesive tape, comprising:
at least two external layers of adhesive, wherein at least one of the at least two external layers is an adhesive (I) comprising:
(a) 35 to 55 wt % of an elastomer component, the elastomer component comprising one or more polyvinylaromatic-polydiene block copolymers;
(b) 20 to 45 wt % of a tackifier resin component, the tackifier resin component comprising at least one tackifier resin having a diacetone alcohol cloud point (DACP) of at least −20° C. and a softening temperature (Ring & Ball) of at least 85° C.; and
(c) 15 to 40 wt % of a plasticizing component, wherein
(c1) 8 to 19 wt % of (c) comprises one or more plasticizing oils, and
(c2) 16 to 25 wt % of (c) comprises one or more non-mineral-oil plasticizers having a softening temperature of less than 30° C. (Ring & Ball).

20. An adhesive tape, comprising:

at least two external layers of adhesive on a dividable carrier, wherein at least one of the at least two external layers is an adhesive (I) comprising:

(a) 35 to 55 wt % of an elastomer component, the elastomer component comprising one or more polyvinylaromatic-polydiene block copolymers;

(b) 20 to 45 wt % of a tackifier resin component, the tackifier resin component comprising at least one tackifier resin having a diacetone alcohol cloud point (DACP) of at least −20° C. and a softening temperature (Ring & Ball) of at least 85° C.; and (c) 15 to 40 wt % of a plasticizing component, wherein
   (c1) 8 to 35 wt % of (c) comprises one or more plasticizing oils, and
   (c2) up to 32 wt % of (c) comprises one or more non-mineral-oil plasticizers having a softening temperature of less than 30° C. (Ring & Ball).

* * * * *